Nov. 29, 1966     A. AXELSSON     3,288,398
EVACUATED HOLLOW STRUCTURES
Filed Aug. 28, 1964
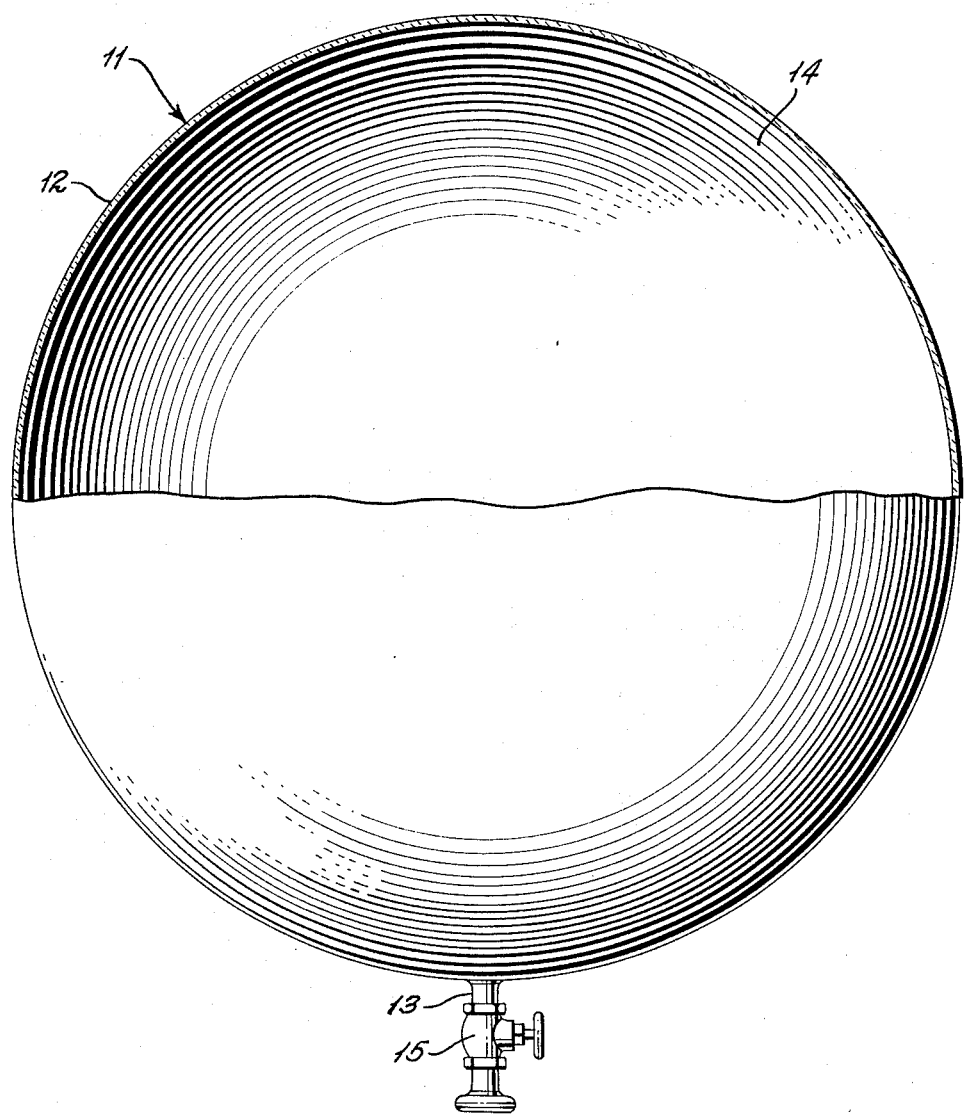
INVENTOR
Axel Axelsson
BY Irons, Birch, Swindler & McKie
ATTORNEYS

United States Patent Office 3,288,398
Patented Nov. 29, 1966

3,288,398
EVACUATED HOLLOW STRUCTURES
Axel Axelsson, 259 S. Coral Ave., Compton, Calif.
Filed Aug. 28, 1964, Ser. No. 392,850
2 Claims. (Cl. 244—31)

This invention relates to evacuated, hollow structures such as rigid ceramic aerial vehicles and structural members.

Aerial vehicles in the form of balloons or dirigibles have been in common use for a long time. Such vehicles generally are comprised of a flexible envelope which is inflated with a lighter-than-air lifting gas such as helium or hydrogen. The balloon envelopes are initially only partially inflated to leave room for the lifting gas to expand as the balloon rises. Expansion of the lifting gas causes a consequent expansion and flexing of the balloon envelope, thus subjecting the envelope to greater and greater stress as the balloon rises. This flexing and stressing of the envelope gradually weakens the material until it fails, thus limiting the number of times the balloon can be used. Prior art balloon type aerial vehicles using helium or hydrogen suffer from the further disadvantage that such gases are relatively expensive. Moreover, hydrogen is dangerously explosive.

There is a further problem of altitude control with balloon type aerial vehicles. In a flexible balloon, if the lifting gas is allowed to escape to permit the balloon to descend, a fresh supply must be pumped in to cause the balloon to rise again. Since the heavy containers normally used to store the gas under high pressure weigh more than the lifting capacity of the gas they contain, it is not practical to carry a supply aloft. Sandbags, therefore, are used as an alternative means of altitude control in flexible balloons. Such altitude control involves alternate letting out of the original gas supply and throwing overboard of the sandbags with which the journey started. The sandbags take up a part of the carrying capacity of the balloon and are, therefore, undesirable.

Structural members, such as beams, which are light of weight and yet strong and durable have long been in demand. Most of such known structural members are relatively heavy in comparison with the load or stress which they are capable of supporting or withstanding.

It is a principal object of the present invention to provide an air evacuated, hollow structure constructed of a rigid ceramic material which is strong and durable.

Another object of the invention is to provide an improved, sturdy aerial vehicle which operates on a vacuum lifting principle thus eliminating the use of an expensive or explosive lifting gas.

A still further object of the invention is to provide a relatively simple and economical method of constructing a rigid ceramic air evacuated hollow structure.

The invention generally relates to an air evacuated, hollow structure comprising a hollow body formed of a rigid ceramic material, said body being substantially evacuated of air to provide a lifting force for said structure and to stress said body in compression, an air outlet communicating with said body, and means for controlling the passage of air through said outlet to vary the lifting force of said structure.

The invention further relates to a relatively simple and economical method of constructing an air evacuated, hollow structure.

The invention having been broadly described, a preferred specific embodiment will now be described in detail with reference to the accompanying drawing which is a view, partially in section, of an aerial vehicle constructed according to the principles of the present invention.

Illustrated in the drawing is a balloon-type aerial vehicle generally referred to by the reference numeral 11 which comprises a hollow body shown as a spherical envelope 12 formed of a rigid ceramic material. The ceramic material employed preferably is aluminum oxide although other suitable ceramic materials also may be used in constructing the aerial vehicle of the present invention. Although the vehicle is shown as spherical, it is not necessarily so restricted and may be constructed of any suitable configuration such as cylindrical, toroidal and the like. With a cylindrical configuration the cylinder ends could most effectively be closed by hemispherical end members.

A spout 13 is formed integrally with the envelope 12 to provide an air outlet for the envelope. The spout 13 has a passageway therethrough which communicates with the space 14 within the envelope. Suitable valve means 15 may be connected to the spout to control the passage of air therethrough. The valve means 15 illustrated in the drawing is only representative of a type of valve which may be used to control the passage of air through the spout.

The spout 13 may be constructed with relatively thick walls which are flared at the bottom and top thereof so that a load may be attached to and supported therefrom.

In a preferred method of constructing an air evacuated, hollow structure such as an aerial vehicle, a collapsible form having the desired configuration, may be inflated, whereupon a coating of the aluminum oxide or other ceramic material is applied to the form. The ceramic material may be applied to the form by spraying or any other suitable process. Once the ceramic material has been applied to the collapsible form it is permitted or caused to harden to form a rigid hollow body or envelope. The envelope, of course, is constructed with any suitable means such as a spout connected thereto to provide an air inlet and outlet means. The collapsible form is then preferably deflated and removed from the rigid envelope through the spout. Any suitable valve means is then attached to the spout to control the passage of air therethrough.

After completion of the hardening of the rigid envelope and the attaching of the valve means to the spout, the air is then evacuated from the inside of the form to form a vacuum therein.

The forming of a vacuum within the rigid envelope serves a two-fold purpose. First, it provides a lifting force for the aerial vehicle due to the fact that the vehicle itself weighs less than the air removed from within the envelope. Hence, to vary the lifting capacity of the vehicle it is only necessary to vary the quantity of air therein.

Secondly, the forming of a vacuum within the envelope stresses the ceramic material comprising the envelope by putting it in compression. Pressure of the air or atmosphere acting toward the center of the evacuated ceramic envelope will tend to compress the material of which the envelope is comprised and will act evenly over the entire surface of the envelope. By so utilizing pressure of the atmosphere to compress the rigid ceramic sphere, the full potential of the compressive strength of the ceramic material is utilized, thus resulting in an envelope having considerable strength.

The utilization of the full compressive strength of the ceramic material has the further advantage of permitting the use of a relatively thin film of ceramic material to form the envelope. Thus, even though a thin film of ceramic material is used, the envelope of the aerial vehicle possesses sufficient strength to support a load therefrom.

A load may be attached to the vehicle in any suitable manner. For example, a load carrying platform may be attached to the spout 13. Alternatively, straps or a harness-type apparatus may encircle the entire envelope and thus support a load therefrom.

As previously mentioned, the lifting capacity of the aerial vehicle may be controlled by varying the amount of air contained within the envelope. In this connection, a vacuum pump may be carried on the load carrying platform attached to the vehicle to provide a simple means for controlling the air within the envelope of the aerial vehicle. To increase the lifting capacity of the vehicle, it is only necessary to remove more air from within the envelope of the vehicle. Conversely, to decrease the lifting capacity it is only necessary to permit air to enter into the envelope and thus decrease the vacuum therein.

Ceramic material is employed to form the vehicle due to the fact that such material possesses great compressive strength while still being light in weight. In this regard, aluminum oxide is a particularly desirable ceramic material in that it has a very favorable compressive strength to weight ratio. This, of course, makes it possible to construct an aerial vehicle having a thin walled envelope which is light in weight and is yet strong enough to permit the forming of a vacuum therein. Aluminum oxide has the further advantage of being in plentiful supply and relatively inexpensive. Ceramic materials in general are also advantageous in that they are impermeable thus making them particularly well suited for resisting the passage of air or gas therethrough.

A rigid ceramic vehicle as described above may be constructed of any suitable size according to the lifting capacity desired. Further, such vehicles may be used for a wide variety of purposes. For example, it would be possible to combine a plurality of such vehicles into one unit to obtain an even greater lifting capacity than with a single unit. The greater the number of individual vehicles, the greater will be the lifting capacity.

As can be seen from the above description, rigid ceramic aerial vehicles possess a number of advantages over prior inflatable balloon type vehicles. Ceramic materials such as aluminum oxide are particularly strong and durable thus permitting the construction of an aerial vehicle which may be used over and over again a great number of times rather than being limited to one or two uses. Moreover, the use of a vacuum to create a lifting force with the vehicle eliminates the use of expensive and/or explosive lifting gases.

The principles previously discussed with particular reference to an aerial vehicle also apply to other air evacuated, hollow structures. For example, a hollow structural member such as a beam may be constructed according to the principles of the present invention. Such a hollow beam formed of a rigid ceramic material and compressively stressed by creation of a vacuum therein has a minimum of dead weight and yet possesses considerable strength and durability.

While the invention has been described with particular reference to a preferred specific embodiment, many other modifications may be made by persons skilled in the art without departing from the scope of the invention defined by the appended claims.

I claim:
1. A balloon-type aerial vehicle comprising
   a thin-walled, rigid envelope consisting of aluminum oxide and having a generally spherical configuration;
   said envelope being substantially evacuated of air to create a vacuum therein to provide a lifting force for said vehicle and to stress said envelope in compression in order to utilize the full compressive strength of the aluminum oxide to obtain a strong lightweight envelope capable of resisting collapse;
   an air outlet communicating with the interior of said envelope; and
   means for controlling the passage of air through said outlet to vary the lifting force of said vehicle.
2. An aerial vehicle as defined in claim 1 wherein said air outlet comprises a spout having a passageway therethrough communicating with the interior of said envelope and said means for controlling the passage of air comprises valve means connected to said spout.

References Cited by the Examiner
UNITED STATES PATENTS

| | | | |
|---|---|---|---|
| 1,390,745 | 9/1921 | Armstrong | 244—126 |
| 1,667,002 | 4/1928 | Hall | 244—128 |
| 2,270,229 | 1/1942 | Neff | 264—32 |
| 2,413,243 | 12/1946 | Neff | 264—32 |
| 3,016,598 | 1/1962 | Anderson et al. | 264—309 |

MILTON BUCHLER, *Primary Examiner.*

T. MAJOR, *Assistant Examiner.*